(12) United States Patent
Sathath et al.

(10) Patent No.: US 7,930,571 B2
(45) Date of Patent: Apr. 19, 2011

(54) INFORMATION PROCESSING APPARATUS AND POWER CONTROL METHOD

(75) Inventors: Anwar Sathath, Ome (JP); Koichi Kaji, Hidaka (JP); Keiji Kanamori, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/720,480

(22) Filed: Mar. 9, 2010

(65) Prior Publication Data

US 2010/0306561 A1 Dec. 2, 2010

(30) Foreign Application Priority Data

May 29, 2009 (JP) .................................. 2009-131135

(51) Int. Cl.
*G06F 1/32* (2006.01)
(52) U.S. Cl. .......................... 713/310; 713/320; 713/340
(58) Field of Classification Search ................... 713/300, 713/310, 320, 340
See application file for complete search history.

(56) References Cited

U.S. PATENT DOCUMENTS

| | | | |
|---|---|---|---|
| 2006/0061951 A1* | 3/2006 | Hara | 361/683 |
| 2010/0219974 A1* | 9/2010 | Lee | 340/825 |
| 2010/0280676 A1* | 11/2010 | Pabon et al. | 700/295 |

FOREIGN PATENT DOCUMENTS

| | | |
|---|---|---|
| JP | 2001-339851 A | 12/2001 |
| JP | 2004-266931 | 9/2004 |
| JP | 2004-266931 A | 9/2004 |
| JP | 2004-312892 A | 11/2004 |
| JP | 2007-110853 | 4/2007 |
| JP | 2007-110853 A | 4/2007 |
| JP | 2007-281857 A | 10/2007 |
| JP | 2008-125270 | 5/2008 |
| JP | 2008-125270 A | 5/2008 |

OTHER PUBLICATIONS

Notice of Reasons for Rejection mailed by Japan Patent Office on Jun. 22, 2010 in the corresponding Japanese patent application No. 2009-131135.

* cited by examiner

*Primary Examiner* — Dennis M Butler
(74) *Attorney, Agent, or Firm* — Knobbe, Martens Olson & Bear LLP (57) ABSTRACT

According to one embodiment, an information processing apparatus includes a wireless communication device and a power management module. The power management module is configured to transmit, in response to disconnection of an external power supply device from a power connector of the information processing apparatus, a command instructing turn-off of a power supply circuit within the external power supply device to a wireless communication circuit within the external power supply device via the wireless communication device.

9 Claims, 5 Drawing Sheets

INFORMATION PROCESSING APPARATUS AND POWER CONTROL METHOD

CROSS-REFERENCE TO RELATED APPLICATIONS

This application is based upon and claims the benefit of priority from Japanese Patent Application No. 2009-131135, filed May 29, 2009, the entire contents of which are incorporated herein by reference.

BACKGROUND

1. Field

One embodiment of the invention relates to an information processing apparatus such as a personal computer, and a power control method which is applied to the information processing apparatus.

2. Description of the Related Art

In recent years, various types of battery-powerable personal computers, such as notebook type computers or laptop type computers, have been developed. Most of such computers have various power management functions for reducing power consumption amounts. In addition, recently, the technology for reducing the standby power of an AC adapter itself for supplying power to the personal computer has begun to be developed. In the state in which an AC adapter is connected to a commercial power supply, power (standby power) is consumed by the operation of the power supply circuit in the AC adapter even in the case where no power is supplied from the AC adapter to the personal computer.

Jpn. Pat. Appln. KOKAI Publication No. 2008-125270 discloses an electronic apparatus having a function of controlling the operation of a primary-side oscillator included in an AC adapter. In this electronic apparatus, a disable signal is supplied to the AC adapter via a control line which is provided on a power connector of the electronic apparatus, thus being able to stop the operation of the oscillator of the AC adapter.

In the meantime, in offices and factories, many users use personal computers on their desks, with the personal computers being connected to AC adapters. When moving to other places such as a meeting room, the user, in many cases, disconnects the AC adapter from the personal computer and carries the personal computer alone. In such cases, if the AC adapter remains connected to the commercial power supply, useless power (standby power) is consumed by the AC adapter.

In the technique of KOKAI No. 2008-125270, the disable signal is supplied from the electronic apparatus to the AC adapter over the cable. Thus, after the AC adapter is disconnected from the electronic apparatus, the AC adapter can no longer be controlled by the electronic apparatus side. Consequently, if the AC adapter is disconnected from the electronic apparatus while the AC adapter remains connected to the commercial power supply, it is possible that useless power is consumed by the AC adapter.

It is necessary, therefore, to realize a novel function which can reduce useless power that is consumed by an external power supply device such as an AC adapter.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided An information processing apparatus which is drivable by a battery, comprising: a wireless communication device configured to execute wireless communication; and a power management module configured to transmit, in response to disconnection of an external power supply device from a power connector of the information processing apparatus, a command instructing turn-off of a power supply circuit within the external power supply device to a wireless communication circuit within the external power supply device via the wireless communication device.

Figure 1:
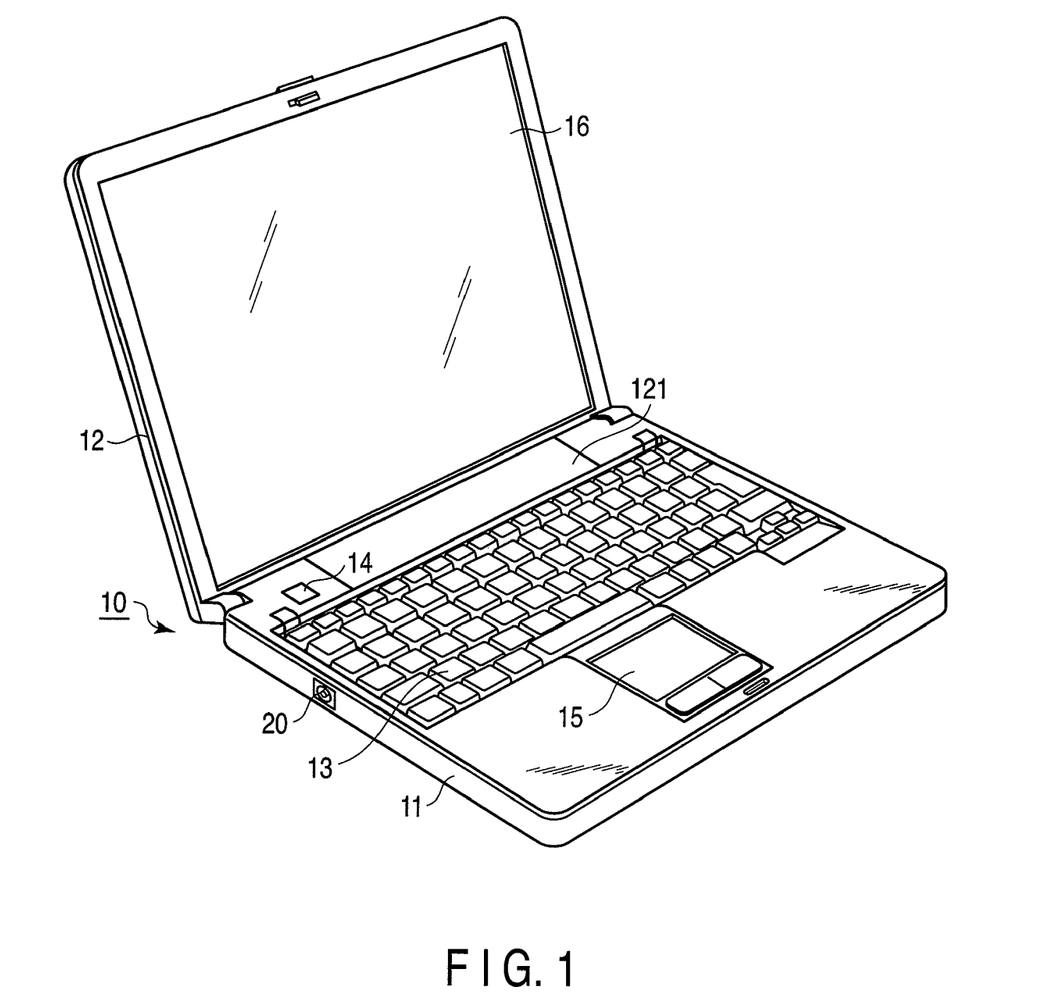
FIG. 1 is an exemplary perspective view showing the external appearance of an information processing apparatus according to an embodiment of the invention.

To begin with, referring to FIG. 1, the structure of an information processing apparatus according to the embodiment of the invention is described. The information processing apparatus is realized, for example, as a battery-powerable portable notebook personal computer 10. FIG. 1 is a perspective view showing the computer 10, as viewed from the front side, in the state in which a display unit thereof is opened. The computer 10 comprises a computer main body 11 and a display unit 12. A display device that is composed of an LCD (Liquid Crystal Display) 16 is built in the display unit 12.

The display unit 12 is supported and attached to the computer main body 11 such that the display unit 12 is freely rotatable between an open position where a top surface of the computer main body 11 is exposed and a closed position where the top surface of the computer main body 11 is covered by the display unit 12. The computer main body 11 has a thin box-shaped casing. A keyboard 13, a power button 14 for powering on/off the computer 10, and a touch pad 15 are disposed on the top surface of the computer main body 11.

A power connector (DC-IN connector) 20 is provided on the computer main body 11. The power connector 20 is provided on a side surface, for instance, a left side surface, of the computer main body 11. An external power supply device is detachably connected to the power connector 20. An AC adapter is usable as the external power supply device. The AC adapter is a power supply device which converts commercial power, that is, alternating current power (AC power), to direct current power (DC power).

The power connector 20 is composed of a jack to which a power plug, which is led out from the external power supply device, such as an AC adapter, can detachably be connected. A battery 121 is provided in the computer main body 11. The battery 121 is detachably mounted, for example, on a rear end part of the computer main body 11.

The computer 10 is driven by power from the external power supply device or power from the battery 121. If the external power supply device is connected to the power connector 20 of the computer 10, the computer 10 is driven by power from the external power supply device. The power from the external power supply device is also used in order to charge the battery 121. While the external power supply device is not connected to the power connector 20 of the computer 10, the computer 10 is driven by power from the battery 121.

The external power supply device used in this embodiment has a wireless communication function. The computer 10 has a function of executing wireless communication with the external power supply device, thereby ON/OFF controlling the power supply circuit within the external power supply device. For example, when the external power supply device is detached from the power connector 20 of the computer 10, the computer 10 automatically transmits a command, which instructs turn-off of the power supply circuit within the external power supply device, to a wireless communication circuit within the external power supply device by a wireless signal. In short, the command is wirelessly transmitted from the computer 10 to the external power supply device. Thereby, for example, when the user detaches the external power supply device from the computer 10 in order to move to another place while carrying the computer 10, the operation of the power supply circuit within the external power supply device can automatically be stopped. Therefore, even if the external power supply device remains connected to the commercial power supply (outlet), the power supply circuit within the external power supply device can be turned off, and the same power-saving effect can be obtained as in the case where the external power supply device is detached from the commercial power supply (outlet).

Figure 2:
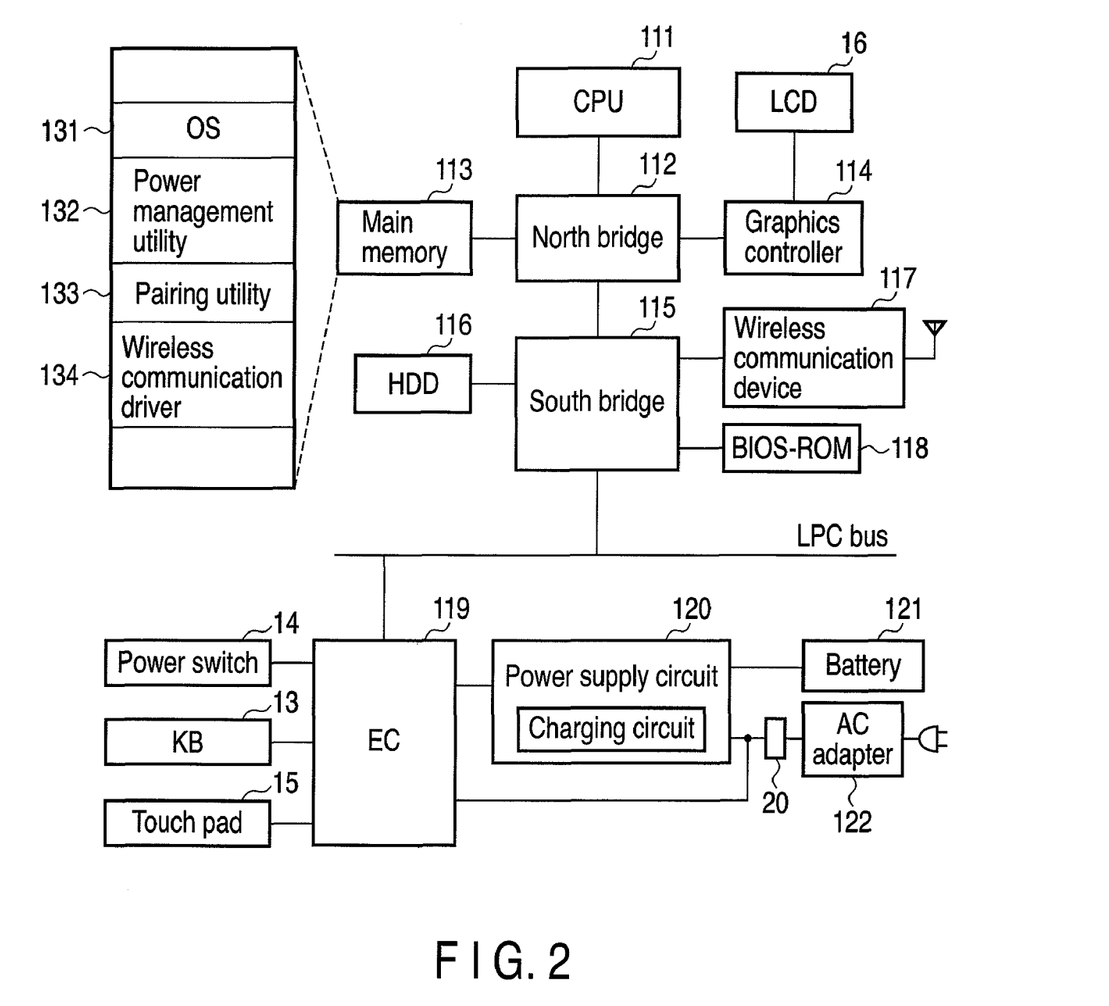
FIG. 2 is an exemplary block diagram showing an example of the system configuration of the information processing apparatus according to the embodiment.

FIG. 2 shows the system configuration of the computer 10. The computer 10 comprises a CPU 111, a north bridge 112, a main memory 113, a graphics controller 114, a south bridge 115, a hard disk drive (HDD) 116, a wireless communication device 117, a BIOS-ROM 118, an embedded controller (EC) 119, a power supply circuit 120, and an AC adapter 122. The AC adapter 122 is used as the above-described external power supply device.

The CPU 111 is a processor which controls the operation of the components of the computer 10. The CPU 111 executes various software programs which are loaded from the HDD 116 into the main memory 113, for instance, an operating system (OS) 131, various application programs, a power management utility program 132, a pairing utility program 133, and a wireless communication driver program 134. The power management utility program 132 is a program for executing power management of each of the computer 10 and the AC adapter 122. The power management utility program 132 executes control, in cooperation with the wireless communication driver program 134, to wirelessly transmit to the AC adapter 122 a command for instructing turn-on/off of the operation of the power supply circuit within the AC adapter 122. In the case where a command for instructing turn-off is wirelessly transmitted to the AC adapter 122, the operation of the power supply circuit within the AC adapter 122 is stopped. The stop of the operation of the power supply circuit can be realized, for example, by turning off a switch circuit which is connected between a power input port (AC inlet) of the AC adapter 122 and the power supply circuit within the AC adapter 122, or by turning off a switch control circuit which is provided on a primary side of the power supply circuit. The power input port (AC inlet) is an input terminal for inputting power (AC power) from the outlet. In the case where the switch circuit, which is connected between the power input port (AC inlet) and the power supply circuit, is turned off, the operation of the power supply circuit is completely stopped. Thereby, even in the state in which the AC adapter 122 is connected to the outlet, an AC power amount, which is consumed by the AC adapter 122, can be reduced to substantially zero.

The pairing utility program 133 is a program for associating the computer 10 and the AC adapter 122. In the present embodiment, ON/OFF control of the AC adapter 122 is executed by a wireless signal from the computer 10. Thus, the pairing utility program 133 executes an association process (also referred to as "authentication process") for associating the computer 10 and the AC adapter 122, thereby to enable the computer 10 to ON/OFF control only a specified AC adapter which is associated with the computer 10. The association process is executed in the state in which the AC adapter 122 is connected to the power connector 20 of the computer 10 over the power cable. In the association process, an identifier (ID) for identifying the AC adapter 122 is transmitted from the AC adapter 122 to the power connector 20 of the computer 10 over the power cable. Specifically, in the transmission of the ID, the AC adapter 122 drives the power line in the power cable at a high level or a low level, thereby transmitting a binary data string indicative of the ID to the computer 10 (DC pulse communication). The pairing utility program 133 saves the ID, which is transmitted from the AC adapter 122, as the ID of the external power supply device that is associated with the computer 10. The power management utility program 132 wirelessly transmits, by a wireless signal, to the AC adapter 122 the above-described command together with the ID that has been saved by the pairing utility program 133. In other words, the command, to which the ID is added, is wirelessly transmitted from the computer 10 to the AC adapter 122. The AC adapter 122 receives the command to which the ID is added, and determines whether the ID that is added to the command agrees with the ID of the AC adapter 122 itself. Only in the case where the ID that is added to the received command agrees with the ID of the AC adapter 122 itself, the AC adapter 122 executes a process which is designated by the received command. Thus, even in the environment in which there are a plurality sets of computers and AC adapters having functions similar to the functions in the present embodiment, it is possible to prevent such a situation from occurring that the power supply circuit of the AC adapter, which is connected to another user's computer, is erroneously turned off.

As has been described above, by adopting the structure that ID of the AC adapter 122 is transmitted to the power supply connector 20 of the computer 10 from the AC adapter 122 over the power cable, there is no need to equip the wireless communication circuit within the AC adapter 122 with the function of a transmission circuit (wireless transmission circuit), and the wireless communication circuit can be realized by a reception circuit (wireless reception circuit) alone. The power consumption of the transmission circuit is greater than the power consumption of the reception circuit. Therefore, by realizing the wireless communication circuit within the AC adapter 122 by the wireless reception circuit alone, the power that is consumed by the wireless communication circuit can greatly be reduced.

The CPU 111 also executes a BIOS (Basic Input/Output System) which is stored in the BIOS-ROM 118 which is a nonvolatile memory. The BIOS is a system program for hardware control. In the present embodiment, the BIOS is used to realize an interface between the each of the utility programs 132 and 133 and the EC 119.

The north bridge 112 is a bridge device which connects a local bus of the CPU 111 and the south bridge 115. The north bridge 112 has a function of executing communication with the graphics controller 114. Further, the north bridge 112 includes a memory controller which controls the main memory 113. The graphics controller 114 is a display controller for controlling the LCD 16 that is used as a display monitor of the computer 10.

The wireless communication device 117 is connected to the south bridge 115. The wireless communication device 117 is realized as a wireless LAN device which executes wireless communication according to the wireless communication standard of, e.g. IEEE 802.11. The wireless communication device 117 is usable for communication with the AC adapter 122, as well as for ordinary data communication with other wireless LAN devices. Specifically, if the AC adapter 122 has the wireless communication function corresponding to wireless LAN, the wireless communication between the AC adapter 122 and the computer 10 can be executed by using wireless LAN. In the meantime, for the wireless communication between the AC adapter 122 and the computer 10, use may also be made of, e.g. Bluetooth® and other various types of short distance wireless communication.

The embedded controller (EC) 119 is a power management controller for executing power management of the computer 10, and is realized, for example, as a 1-chip microcomputer which incorporates a keyboard controller for controlling the keyboard (KB) 13 and touch pad 15. The EC 119 cooperates with the power supply circuit 120 to power on/off the computer 10 in response to the user's operation of the power switch 14. The EC 119 is connected to the power connector 20, and can function as a reception module for receiving data (e.g. ID) which is transmitted from the AC adapter 122 by DC pulse communication. Specifically, the EC 119 detects a variation in voltage of the power line of the power connector 20, and recognizes the variation in voltage of the power line as binary data.

The EC 119 can detect, in cooperation with the power supply circuit 120, that the AC adapter 122 is connected to the computer 10, and that the AC adapter 122 is disconnected from the computer 10. The connection/disconnection of the AC adapter 122 can be detected, for example, on the basis of whether power is supplied from the AC adapter 122. In the case where no power is supplied from the AC adapter 122 to the power supply circuit 120 via the power connection 20, it is determined that the AC adapter 122 is not connected to the computer 10. On the other hand, in the case where power is supplied from the AC adapter 122 to the power supply circuit 120 via the power connection 20, it is determined that the AC adapter 122 is connected to the computer 10.

In the case where power is supplied from the AC adapter 122, the power supply circuit 120 generates power for driving the system by using the power from the AC adapter 122. Besides, the power supply circuit 120 includes a charging circuit. The charging circuit charges the battery 121 by using the power from the AC adapter 122 in the case where power is supplied from the AC adapter 122. When the battery 121 is charged to a full-charged state, the charging of the battery 121 is automatically stopped. In the case where no power is supplied from the AC adapter 122, the power supply circuit 120 generates power for driving the system by using power from the battery 121. In this manner, under the control of the EC 119, the power supply circuit 120 automatically switches the power source between the AC adapter 122 and the battery 121, according to whether the power from the AC adapter 122 is supplied to the computer 10 or not.

The ON/OFF control for turning on/off the AC adapter 122 can be executed, as described below, on the basis of a determination result as to whether the AC adapter 122 is connected to the computer 10, and a determination result as to whether the battery 121 is in a full-charged state.

(1) Turn-Off of the AC Adapter 122

(1-1) When the AC adapter 122 is detached from the computer 10, the computer 10 wirelessly transmits a command for instructing turn-off of the power supply circuit of the AC adapter 122 to the AC adapter 122 via the wireless communication device 117. Thereby, the power supply circuit within the AC adapter 122 is automatically turned off when the user disconnects the AC adapter 122 from the computer 10 in order to move to another place, such as a meeting room, from the his/her own desk while carrying the computer 10. Accordingly, even if the AC adapter 122 is not disconnected from the outlet, the power that is consumed by the AC adapter 122 can be reduced.

(1-2) When the AC adapter 122 is connected to the computer 10 and the battery 121 is charged up to a full-charged state, the computer 10 wirelessly transmits a command for instructing turn-off of the power supply circuit of the AC adapter 122 to the AC adapter 122 via the wireless communication device 117. The full-charged state of the battery 121 means that the remaining capacity of the battery 121 is a predetermined first threshold value or more. The first threshold value is preset on the basis of a rating capacity. Since the power supply circuit within the AC adapter 122 is automatically turned off by the command from the computer 10, the standby power of the AC adapter 122 can be reduced. In addition, when the power supply circuit within the AC adapter 122 is turned off, the power source of the computer 10 is automatically switched from the power from the AC adapter 122 to the power from the battery 121. Therefore, even in the state in which the AC adapter 122 is connected to the computer 10, the power of the battery 121 can effectively be utilized and thus the amount of use of the commercial power supply can be reduced.

(2) Turn-On of the Power Supply Circuit of AC Adapter 122

(2-1) When the AC adapter 122 is connected to the computer 10, the computer 10 wirelessly transmits a command for instructing turn-on of the power supply circuit of the AC adapter 122 to the AC adapter 122 via the wireless communication device 117.

(2-2) When the AC adapter 122 is connected to the computer 10 and the remaining capacity of the battery 121 has decreased to a second threshold value or less, the computer 10 wirelessly transmits a command for instructing turn-on of the power supply circuit of the AC adapter 122 to the AC adapter 122 via the wireless communication device 117. As the second threshold value, use may be made of, for instance, a value lower than the above-described first threshold value. When the power supply circuit of the AC adapter 122 is turned on, the power source of the computer 10 is automatically switched from the power from the battery 121 to the power from the AC adapter 122. In addition, the charging of the battery 121 is started.

Figure 3:
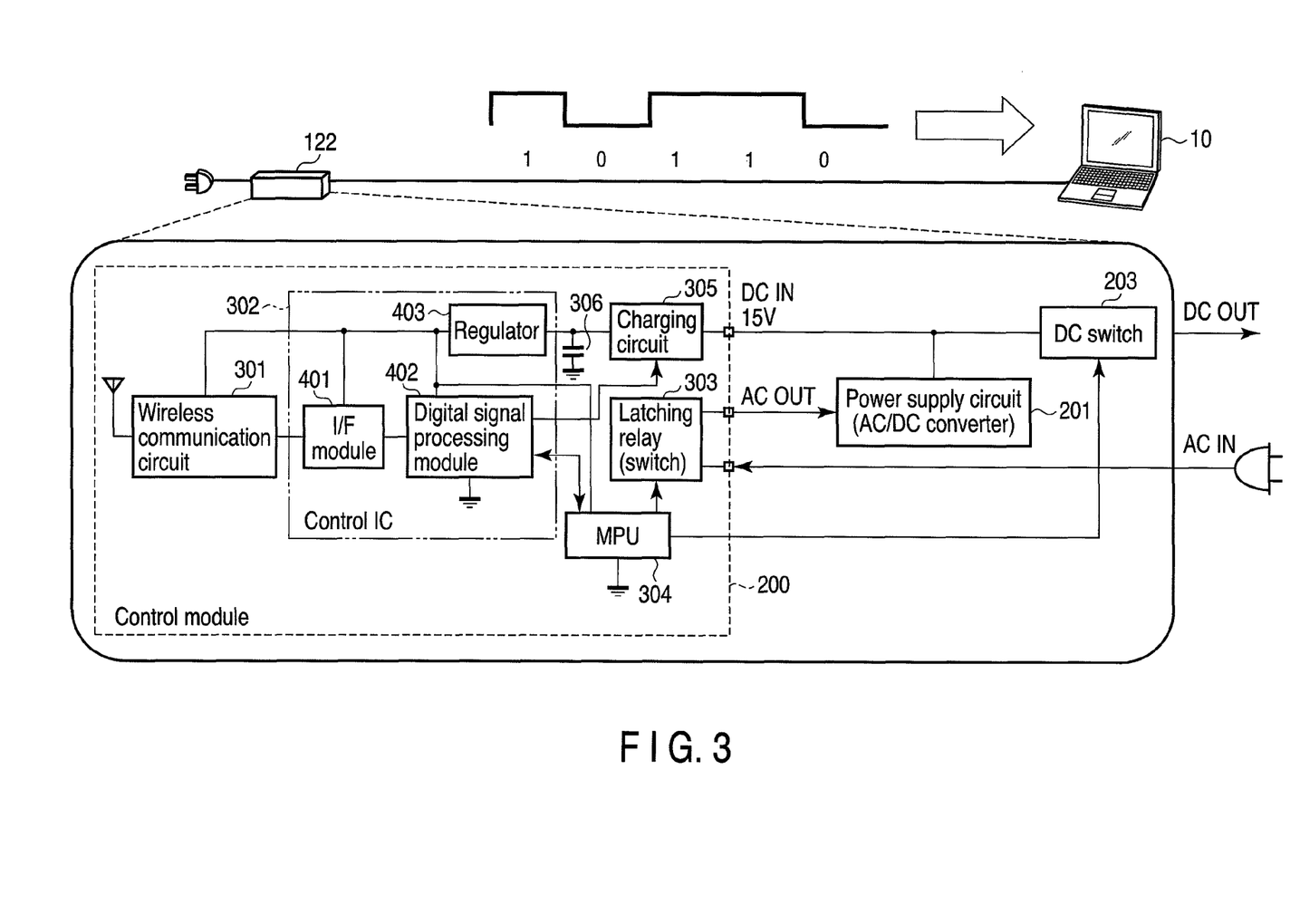
FIG. 3 is an exemplary block diagram showing a structure example of an external power supply device which supplies power to the information processing apparatus of the embodiment.

Next, referring to FIG. 3, a structure example of the AC adapter 122 is described.

The AC adapter 122 includes a power input port (AC IN) for inputting alternating current power (AC power), and a power output port (DC OUT) for outputting direct current power (DC power). A cable for connection to the outlet is led out of the power input port (AC IN). A power cable having a plug, which is connectable to the power connector 20 of the computer 10, is led out of the power output port (DC OUT). The AC adapter 122 includes a control module 200, a power supply circuit 201 and a DC switch 203.

The DC switch 203 is connected between the output of the power supply circuit 201 and the power output port (DC IN). The DC switch 203 is used as a switch circuit for driving the power line at a high level (e.g. 15 V) or a low level (e.g. 0 V). The control module 200 ON/OFF controls ("switching control") the DC switch 203, thus being able to transmit a binary data string indicative of the ID of the AC adapter 122 to the computer 10 by DC pulse communication.

The power supply circuit 201 supplies power for driving the computer 10. The power supply circuit 201 functions as an AC to DC converter. Specifically, the power supply circuit 201 converts AC power, which is input to the power input port (AC IN), to DC power, and outputs the DC power to the power output port (DC OUT). The power supply circuit 201 includes, for example, a transformer, a primary-side circuit which is connected to the primary side of the transformer, and a secondary-side circuit which is connected to the secondary side of the transformer. The primary-side circuit includes a rectifying circuit and a switching circuit. The secondary-side circuit includes a smoothing circuit, and a control circuit for switch-controlling the switching circuit.

At a time of a light load or at a time of no load, the switching frequency of the switching circuit in the primary-side circuit is automatically lowered. However, as long as the AC power is input to the power supply circuit 201, the switching circuit and control circuit continue to operate. Consequently, the power supply circuit 201 consumes useless power (standby power).

In the present embodiment, a latching relay 303 is connected between the primary-side circuit of the power supply circuit 201 and the power input port (AC IN). The latching relay 303 is a switch circuit for connecting or disconnecting the primary-side circuit of the power supply circuit 201 and the power input port (AC IN). By turning off the latching relay 303, the operation of the power supply circuit 201 can be stopped, and the standby power of the power supply circuit 201 can be reduced to zero.

The control module 200 includes a wireless communication function, a function of turning on/off the power supply circuit 201 with use of the latching relay 303, and a function of executing DC pulse communication with use of the DC switch 203.

The control module 200 includes a wireless communication circuit 301, a control IC 302, a latching relay 303, a microprocessor (MPU) 304, a charging circuit 305, and a capacitor 306.

The wireless communication circuit 301 is a circuit for receiving a wireless signal which is transmitted from the computer 10, and the wireless communication circuit 301 includes an antenna and a filter. The wireless communication circuit 301 extracts a modulated signal, such as an ASK (Amplitude Shift Keying) signal, from a wireless signal which has been received, and outputs the modulated signal to the control IC 302. The control IC 302 is an IC which is operable with a small power consumption (e.g. a power consumption of about 1/100 of the standby power of an ordinary AC adapter). The control IC 302 includes an interface module 401, a digital signal processing module 402, and a regulator 403. The interface module 401 receives an ASK signal and sends the received ASK signal to the digital signal processing module 402. The digital signal processing module 402 demodulates the ASK signal, and executes a process of determining the content of a command which is included in the wireless signal that is transmitted from the computer 10. The digital signal processing module 402 transmits a predetermined instruction to the MPU 304 in accordance with the command (on-command, off-command) from the computer 10, thereby turning on/off the latching relay 303. The default state of the latching relay 303 is, for example, an on-state.

In addition, the digital signal processing module 402 has a function of transmitting to the MPU 304 a command for instructing transmission of the ID for pairing, and a function of transmitting to the MPU 304 a command for instructing transmission of an acknowledgement (ACK). The digital signal processing module 402 monitors, with use of a timer, an elapsed time from the last reception of the off-command that is sent from the computer 10. When the elapsed time from the last reception of the off-command has exceeded a predetermined time, the digital signal processing module 402 turns on the latching relay 303 by controlling the latching relay 303 via the MPU 304. This aims at supplying power for charging the capacitor 306 to the charging circuit 305. The capacitor 306 functions as a battery of a small size, that is, a small capacity. Since the power consumption of the control module 200 is vary small, the control module 200 can operate, for example, for several tens of days to several months, by only the power accumulated in the capacitor 306. Moreover, the digital signal processing module 402 executes control of the charging circuit 305.

The regulator 403 uses the power from the power supply circuit 201 or the power accumulated in the capacitor 306, thereby generating the power for driving the respective components in the control module 200, for example, the wireless communication circuit 301, interface module 401, digital signal processing module 402 and MPU 304.

The MPU 304 executes a process of turning on/off the latching relay 303, under the control of the digital signal processing module 402. Furthermore, the MPU 304 executes a process of transmitting the ID or ACK to the computer 10 by ON/OFF controlling the DC switch 203 under the control of the digital signal processing module 402. The ACK is an acknowledgement signal to the command from the computer 10.

Figure 4:
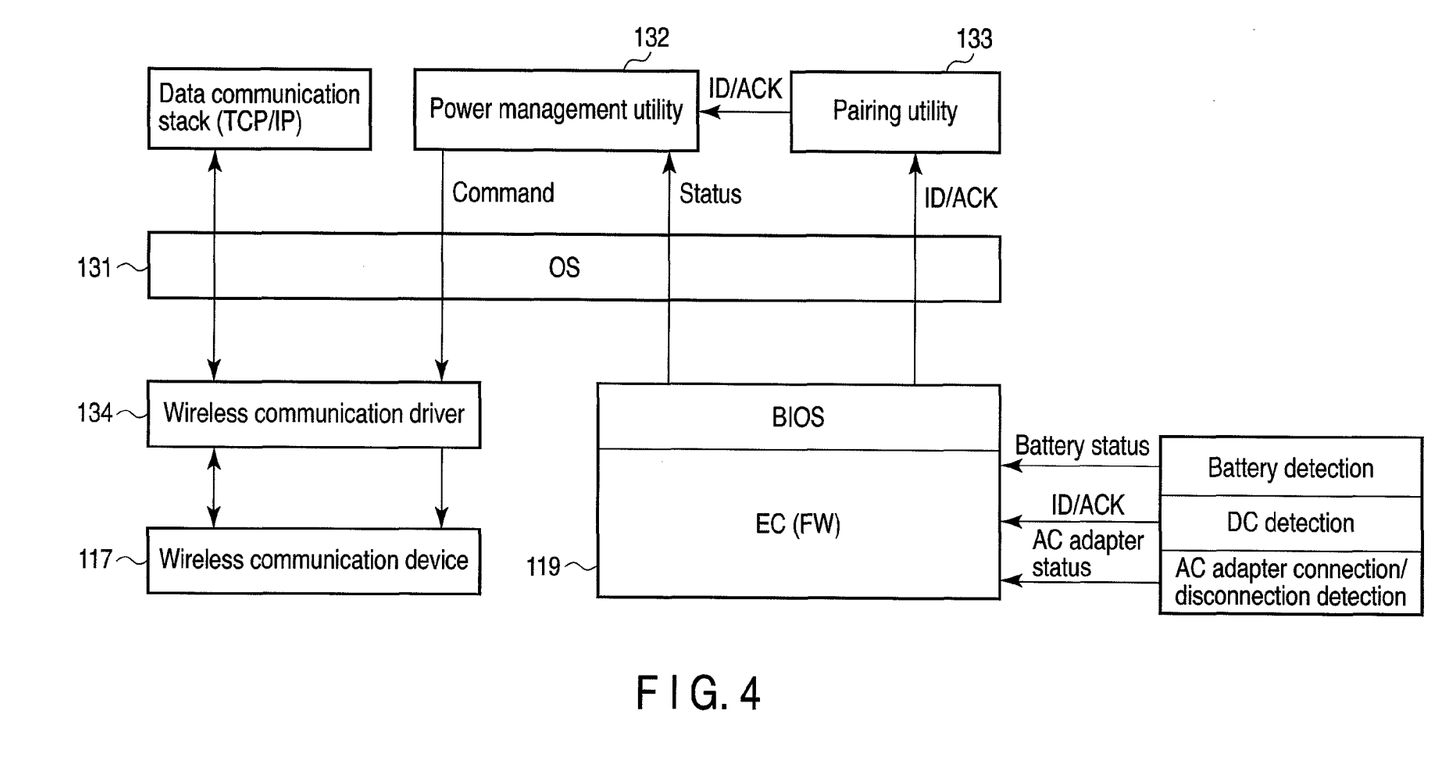
FIG. 4 shows the relationship between hardware and software for realizing a power management function of the information processing apparatus of the embodiment.

Next, referring to FIG. 4, the functional structure of the computer 10 is described.

The EC 119 is configured to monitor a status relating to connection/disconnection of the AC adapter 122, and a status (a full-charged state, a state in which charge is needed, a remaining capacity) of the battery 121, and to execute charging control of the battery 121. Further, the EC 119 has a function of supporting the DC pulse communication (ID, ACK), and can receive and recognize the ID or ACK that is transmitted from the AC adapter 122 via the power line, and can report the recognized ID or ACK to the BIOS.

The BIOS executes a process of reporting the status of the AC adapter 122 and the status of the battery 121 to each of the power management utility program 132 and pairing utility program 133. In addition, the BIOS executes a process of reporting each of the ID and ACK, which are received from the AC adapter 122 by the DC pulse communication, to the pairing utility program 133. For the communication between the BIOS and each of the power management utility program 132 and pairing utility program 133, use may be made of an interface which is called "host configuration interface (HCI)".

The pairing utility program 133 issues, for example, a request for wireless transmission of a pairing command to the wireless communication driver program 134 via the power management utility program 132. The pairing command is an (initial) authentication command for issuing to the AC adapter 122 a request for transmission of the ID. The wireless communication driver program 134 wirelessly transmits the pairing command to the AC adapter 122 via the wireless communication module 117.

The power management utility program 132 issues a request for wireless transmission of an on-command or an off-command to the wireless communication driver program 134. The wireless communication driver program 134 wirelessly transmits the on-command or off-command to the AC adapter 122 via the wireless communication module 117.

The power management utility program 132 can enable or disable the ON/OFF control function for the AC adapter in accordance with the user's operation. The default set value of the ON/OFF control function is, for example, "disable".

Figure 5:
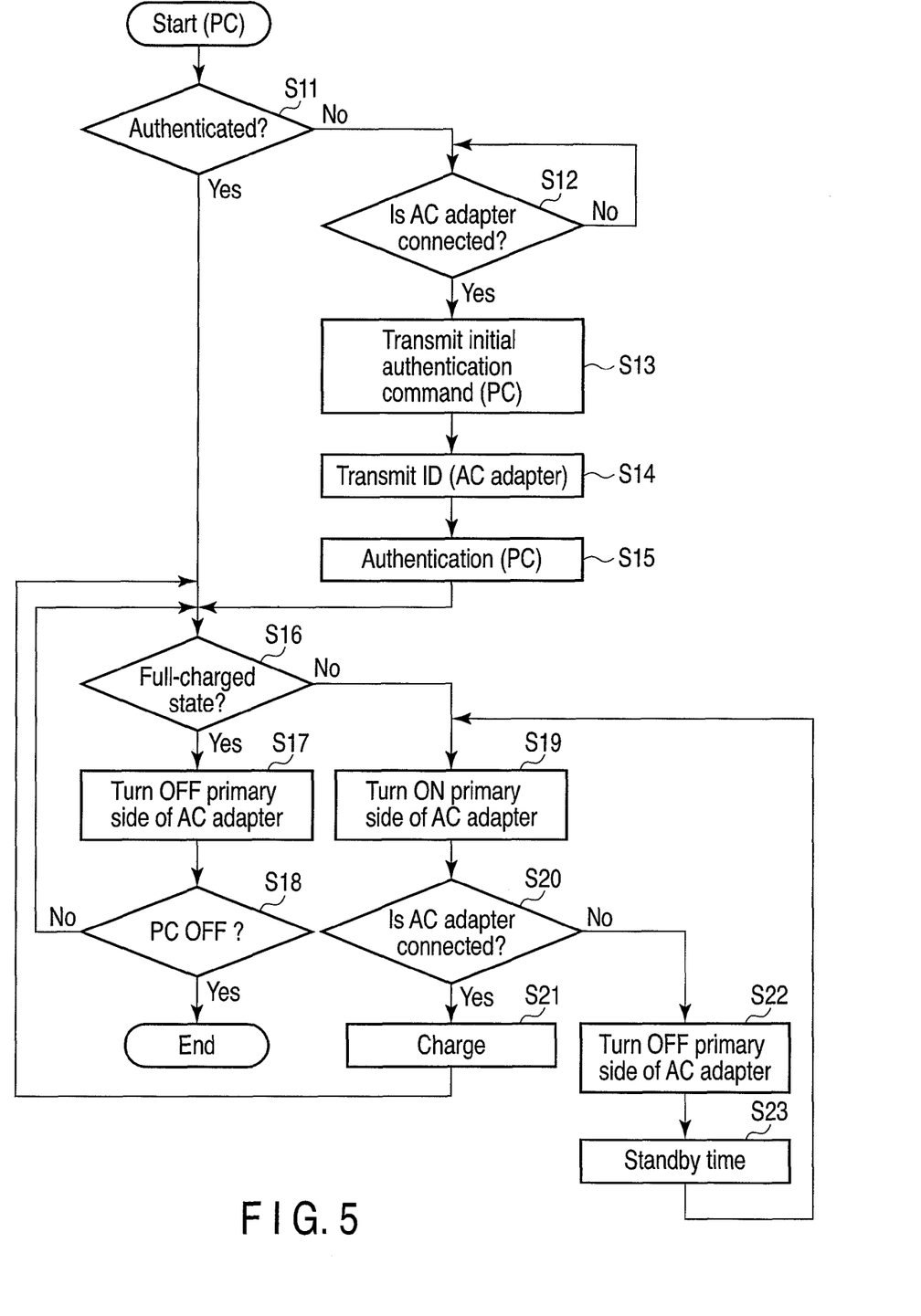
FIG. 5 is an exemplary flow chart illustrating the procedure of a power management process which is executed by the information processing apparatus of the embodiment.

Next, referring to a flow chart of FIG. 5, a description is given of the procedure of the power management process which is executed by the computer 10.

For example, when the computer (PC) 10 is powered on, the pairing utility program 133 determines whether there is an AC adapter which has already been authenticated (i.e. an AC adapter which is associated with the computer 10) (block S11). If there is no AC adapter which has already been authenticated, that is, if the ID of an AC adapter is not stored in the computer (PC) 10, the pairing utility program 133 determines whether the AC adapter 122 is connected to the computer main body 11, in accordance with the status that is reported from the BIOS (block S12). If the AC adapter 122 is connected to the computer main body 11, the pairing utility program 133 wirelessly transmits a pairing command, i.e. an (initial) authentication command, to the wireless communication circuit 301 of the AC adapter 122 via the wireless communication module 117 (block S13). In block S13, the pairing command may be broadcast.

Upon receiving the pairing command, the control IC 302 within the AC adapter 122 switch-controls the DC switch 203 via the MPU 304, thereby transmitting a unique ID of the AC adapter 122 to the computer main body 11 over the power line (block S14). By monitoring the voltage of the power line, the EC 119 can receive the ID that is sent from the AC adapter 122. The ID that is received by the EC 119 is sent to the pairing utility program 133 via the BIOS. The pairing utility program 133 saves the ID as the information for identifying the AC adapter that is authenticated, thereby associating the AC adapter and the computer 10 in one-to-one correspondence (block S15).

If there is an already authenticated AC adapter (YES in block S11) or if the execution of the process of blocks S12 to S15 has been completed, the following process is executed under the control of the power management utility program 132.

The power management utility program 132 determines, in accordance with the status reported from the BIOS, whether the battery 121 is in the full-charged state, that is, whether the remaining capacity of the battery 121 is the above-described first threshold value or more (block S16). If the battery 121 is in the full-charged state and the AC adapter 122 is connected to the computer 10 (YES in block S16), the power management utility program 132 wirelessly transmits an off-command, together with the ID of the AC adapter 122, to the wireless communication circuit 301 of the AC adapter 122, thereby to turn off the power supply circuit 201 of the AC adapter 122 (block S17). The AC adapter 122 determines whether the received ID is the ID of the AC adapter 122. The execution of the process corresponding to the received command is permitted only when the received ID agrees with the ID of the AC adapter 122. In the description below, it is assumed that the received ID agrees with the ID of the AC adapter 122.

In the AC adapter 122, the latching relay 303 is turned off in response to the reception of the off-command, and thereby the supply of AC power to the power supply circuit 201 is shut off. As a result, the operation of the switching circuit in the primary-side circuit of the power supply circuit 201 is stopped.

During the time period in which the computer 10 is in the power-on state (NO in block S18), the process of block S16 is periodically executed. In the case where the remaining capacity of the battery 121 has decreased and the charging of the battery 121 has become necessary, that is, in the case where the remaining capacity of the battery 121 has decreased to the second threshold value (second threshold value<first threshold value) (NO in block S16), the power management utility program 132 wirelessly transmits an on-command, to which the ID of the AC adapter 122 is added, to the wireless communication circuit 301 of the AC adapter 122, thereby to turn on the power supply circuit 201 of the AC adapter 122 (block S19). In the AC adapter 122, the latching relay 303 is turned on in response to the reception of the on-command, and thereby the supply of power to the power supply circuit 201 is started. If the AC adapter 122 is connected to the computer main body 11 (YES in block S20), the process of charging the battery 121 by the power from the AC adapter 122 is executed under the control of the EC 119 (block S21).

If the battery 121 comes to the full-charged state once again (YES in block S16), the power management utility program 132 wirelessly transmits the off-command, to which the ID of the AC adapter 122 is added, to the wireless communication circuit 301 of the AC adapter 122, thereby to turn off the power supply circuit 201 of the AC adapter 122 (block S17).

In the case where the battery 121 is not in the full-charged state (NO in block S16), a process of turning off the power supply circuit 201 of the AC adapter 122 is executed, triggered by the disconnection of the AC adapter 122 from the computer main body 11.

Specifically, in the case where the power supply circuit 201 of the AC adapter 122 is turned on and the AC adapter 122 is connected to the computer main body 11, the process of charging the battery 121 by the power from the AC adapter 122 is executed under the control of the EC 119 (block S20, S21). In accordance with the status of the AC adapter which is reported from the BIOS, the power management utility program 132 determines whether the AC adapter 122 has been disconnected from the computer main body 11 (block S20).

If the AC adapter 122 is disconnected from the computer main body 11 (NO in block S20), the power management utility program 132 wirelessly transmits the off-command, to which the ID of the AC adapter 122 is added, to the wireless communication circuit 301 of the AC adapter 122, thereby to turn off the power supply circuit 201 of the AC adapter 122 (block S22). In the AC adapter 122, the latching relay 303 is turned off in response to the reception of the off-command, and thereby the supply of AC power to the power supply circuit 201 is shut off. As a result, the operation of the switching circuit in the primary-side circuit of the power supply circuit 201 is stopped. After the off-command is transmitted, the power management utility program 132 waits until a predetermined time period has passed (block S23). If the predetermined time period has passed since the transmission of the off-command, or if the predetermined time period has passed since the reception of an ACK to the off-command, the power management utility program 132 wirelessly transmits the on-command, to which the ID of the AC adapter 122 is added, to the wireless communication circuit 301 of the AC adapter 122, and turns on the power supply circuit 201 of the AC adapter 122, thereby to make it possible to correctly determine whether the AC adapter 122 is connected to the computer main body 11 (block S19). If the AC adapter 122 is not connected to the computer main body 11 (NO in block S20), the power management utility program 132 wirelessly transmits the off-command, to which the ID of the AC adapter 122 is added, to the wireless communication circuit 301 of the AC adapter 122, thereby to turn off the power supply circuit 201 of the AC adapter 122 (block S22).

In the meantime, regardless of whether the battery 21 is in the full-charged state or not, the off-command may be transmitted such that the transmission of the off-command is triggered only by the disconnection of the AC adapter 122 from the computer main body 11.

As has been described above, in the present embodiment, the command (off-command) which instructs turn-off of the power supply circuit 201 within the AC adapter 122 is transmitted to the wireless communication circuit 301 within the AC adapter 122 via the wireless communication device 117, in response to the disconnection of the AC adapter 122 from the computer main body 11. Accordingly, for example, when the user has disconnected the AC adapter 122 from the computer 10 in order to move to a meeting room, etc., while carrying the computer 10, the operation of the power supply circuit 201 within the AC adapter 122 can automatically be stopped. Therefore, even if the AC adapter 122 remains connected to the commercial power supply, the power that is consumed by the AC adapter 122 can greatly be reduced.

By virtue of the structure in which the AC adapter is ON/OFF controlled by using a wireless signal, the standby power of the AC adapter 122 can be reduced without providing a purpose-specific control line on a power connector or a power cable. In the present embodiment, since pairing is automatically executed, only a specified AC adapter, which is associated with the computer 10, can be set to be an object of ON/OFF control.

In the present embodiment, the IEEE 802.11 standard (wireless LAN) is exemplified as the wireless communication method for controlling the AC adapter. Alternatively, wireless communication of other arbitrary wireless communication standards may be used for controlling the AC adapter.

In this embodiment, the AC adapter has been exemplified as the external power supply device. However, the ON/OFF control of this embodiment is applicable not only to the AC adapter, but also to various power supply devices (e.g. fuel cells) which consume standby power.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus configured receive power from a battery, comprising:
a wireless communication device; and
a power management module configured to transmit, to a wireless communication circuit of an external power supply device via the wireless communication device, a command to power down a power supply circuit in the external power supply device, if the external power supply device is disconnected from a power connector of the information processing apparatus.

2. The information processing apparatus of claim 1, further comprising an ID receiver configured to receive an ID of the external power supply device, the ID being transmitted from the external power supply device to the power connector over a power cable,
wherein the power management module is configured to transmit the command with the received ID, to the wireless communication circuit in the external power supply device via the wireless communication device.

3. The information processing apparatus of claim 1, wherein the power management module is configured to transmit the command to the wireless communication circuit in the external power supply device via the wireless communication device, when the external power supply device is connected to the information processing apparatus and a remaining capacity of the battery is equal to or larger than a first threshold value.

4. An information processing system comprising an information processing apparatus configured to receive power from a battery, and an external power supply device configured to supply power to the information processing apparatus,
the information processing apparatus comprising:
a wireless communication device; and
a power management module configured to transmit, via the wireless communication device, a first command to the external power supply device if the external power supply device is disconnected from a power connector of the information processing apparatus, the first command being for powering down a power supply circuit in the external power supply device, and
the external power supply device comprising:
a power supply circuit configured to supply the power;
a wireless communication circuit; and
a controller configured to stop the operation of the power supply circuit when the wireless communication circuit receives the first command.

5. The information processing system of claim 4, further comprising an authentication command transmitter configured to transmit an authentication command to the external power supply device via the wireless communication device, and a receiver configured to receive an ID of the external power supply device, the ID being supplied to the power connector from the external power supply device over a power cable,
wherein the power management module is configured to transmit the first command with the received ID to the wireless communication circuit in the external power supply device via the wireless communication device.

6. The information processing system of claim 4, wherein the power management module is configured to transmit the first command to the wireless communication circuit in the external power supply device via the wireless communication device, when the external power supply device is connected to the information processing apparatus and a remaining capacity of the battery is equal to or larger than a first threshold value.

7. The information processing system of claim 4, wherein the external power supply device comprises a battery and a circuit configured to charge the battery in the external power supply device with power from the power supply circuit, and the wireless communication circuit and the controller are driven by power from the battery in the external power supply device.

8. A power control method for controlling an external power supply device configured to supply power to an information processing apparatus configured to receive power from a battery, comprising:
 determining, by the information processing apparatus, whether the external power supply device is disconnected from a power connector of the information processing apparatus; and
 transmitting, by the information processing apparatus, a command to power down a power supply circuit in the external power supply device to a wireless communication circuit in the external power supply device via a wireless communication device in the information processing apparatus if the external power supply device is disconnected from the power connector.

9. The power control method of claim 8, further comprising receiving, by the information processing apparatus, an ID of the external power supply device, the ID being transmitted from the external power supply device to the power connector over a power cable,
 wherein the transmitting the command comprises transmitting the command with the received ID to the wireless communication circuit in the external power supply device via the wireless communication device.

\* \* \* \* \*